United States Patent
Taniguchi

(10) Patent No.: US 9,541,572 B2
(45) Date of Patent: Jan. 10, 2017

(54) MOTION DETECTION DEVICE AND MOTION ANALYSIS DEVICE

(71) Applicant: SEIKO EPSON CORPORATION, Tokyo (JP)

(72) Inventor: Tsutomu Taniguchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 309 days.

(21) Appl. No.: 14/306,913

(22) Filed: Jun. 17, 2014

(65) Prior Publication Data

US 2014/0373630 A1 Dec. 25, 2014

(30) Foreign Application Priority Data

Jun. 21, 2013 (JP) .................. 2013-130319

(51) Int. Cl.
*A63B 69/36* (2006.01)
*G01P 13/02* (2006.01)

(52) U.S. Cl.
CPC ............... *G01P 13/02* (2013.01); *A63B 60/46* (2015.10); *A63B 69/3632* (2013.01); *A63B 2220/40* (2013.01); *A63B 2225/50* (2013.01)

(58) Field of Classification Search
CPC ..... G01P 1/023; A63B 60/46; A63B 69/3632; A63B 220/8332
USPC ............................................. 73/493
See application file for complete search history.

(56) References Cited

U.S. PATENT DOCUMENTS

| 6,739,981 | B1 * | 5/2004 | Lin | A63B 69/3632 |
| | | | | 473/219 |
| 7,870,790 | B2 | 1/2011 | Sato et al. | |
| 8,840,484 | B2 * | 9/2014 | Parke | G01P 1/023 |
| | | | | 473/221 |

FOREIGN PATENT DOCUMENTS

| JP | A-2008-73210 | 4/2008 |
| JP | A-2008-125722 | 6/2008 |

* cited by examiner

*Primary Examiner* — John Chapman, Jr.
(74) *Attorney, Agent, or Firm* — Oliff PLC

(57) ABSTRACT

A motion detection device includes: a base on which an electronic component is loaded; and a holder installed on a sporting equipment. A fitting portion where the base and the holder can be attached to and removed from each other is provided. The fitting portion is provided with a recessed part provided on the base or the holder, and a protruding part provided on the other and fitting with the recessed part.

12 Claims, 8 Drawing Sheets

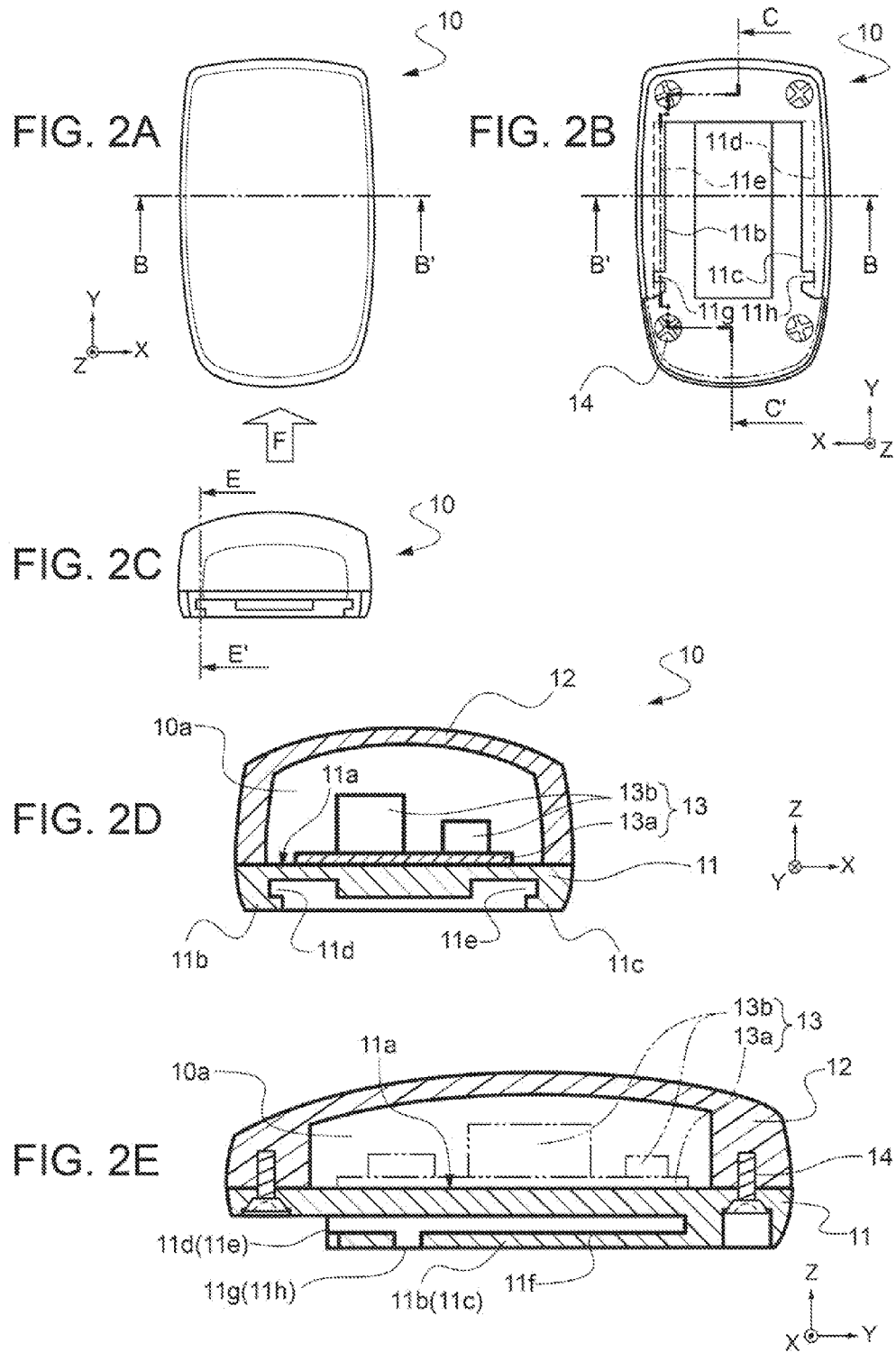

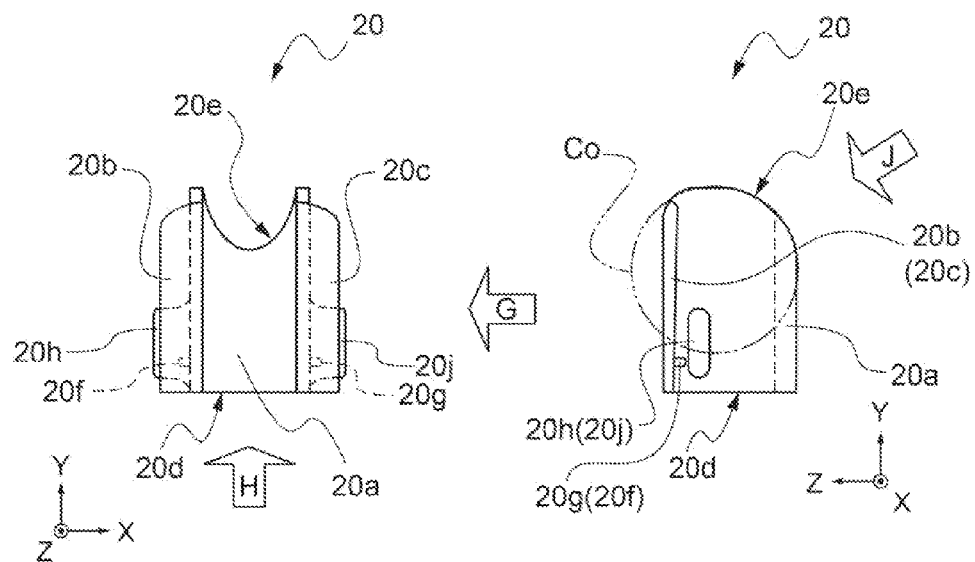
FIG. 3A
FIG. 3B
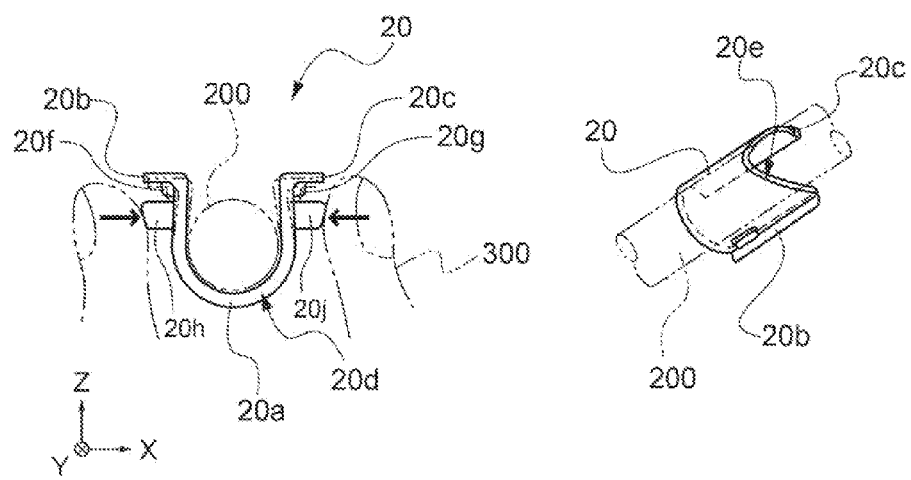
FIG. 3C
FIG. 3D

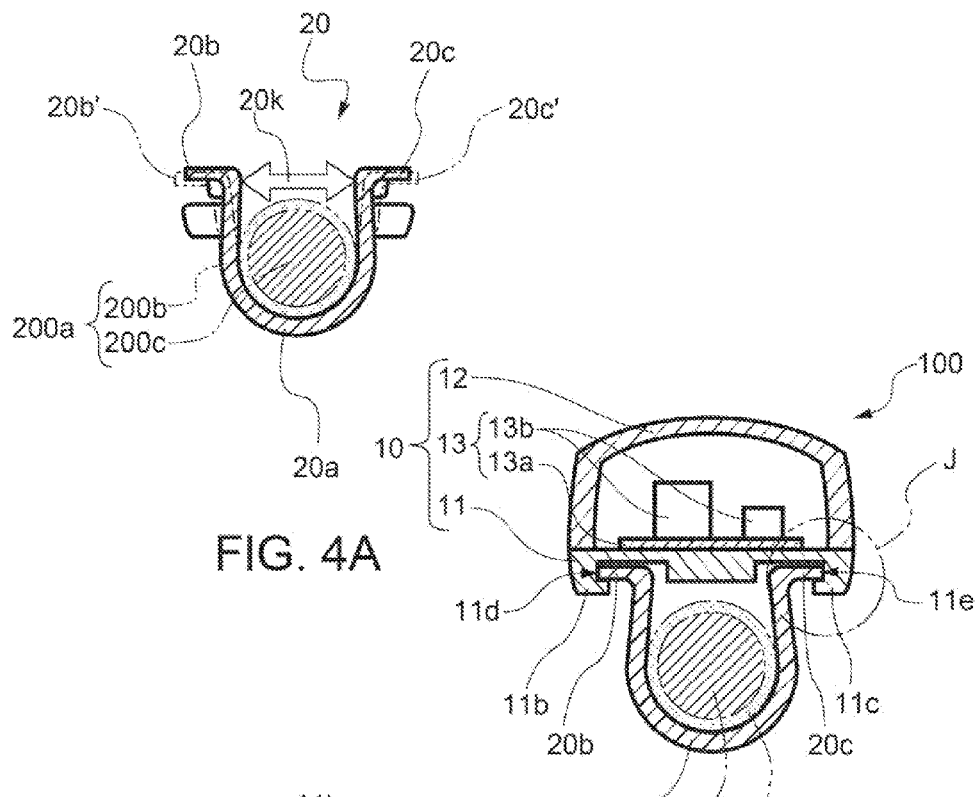
FIG. 4A
FIG. 4B
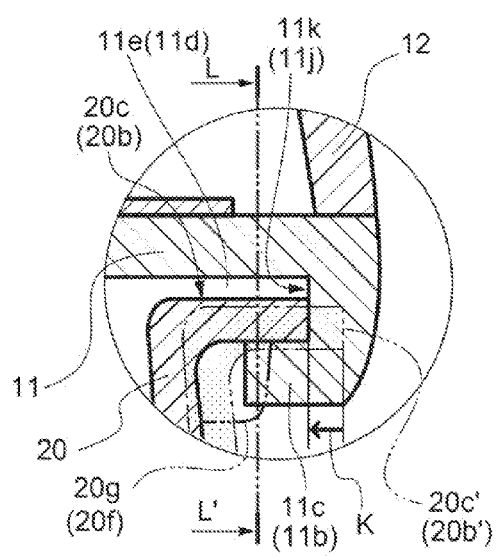
FIG. 4C

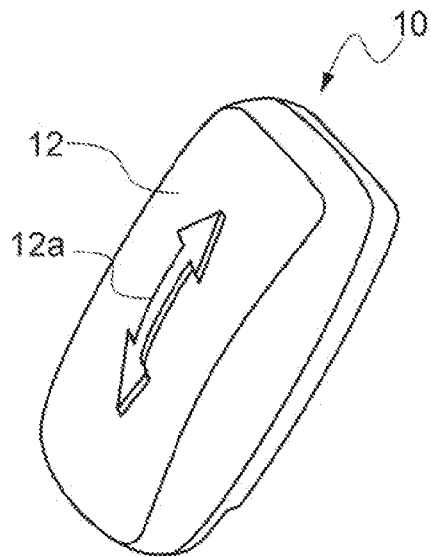
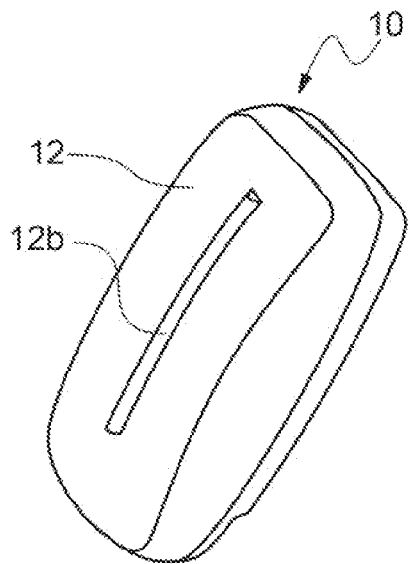
FIG. 6A    FIG. 6B
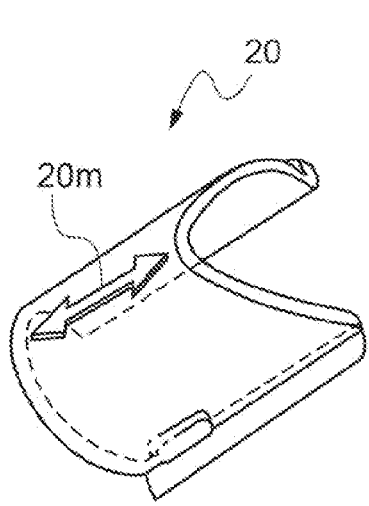
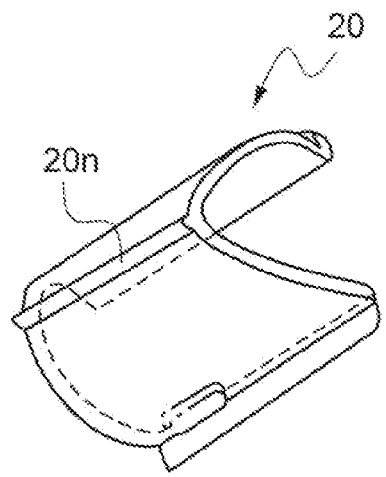
FIG. 6C    FIG. 6D

MOTION DETECTION DEVICE AND MOTION ANALYSIS DEVICE

BACKGROUND

1. Technical Field

The present invention relates to a motion detection device and a motion analysis device.

2. Related Art

As a technique for analyzing and evaluating a motion of swinging a golf club, tennis racket, baseball bat or the like, analysis and evaluation based on an image shot with a camera is known. However, the analysis based on an image has some constraints and swing analysis using plural acceleration sensors or gyro sensors or the like attached no a golf club is known, as described in JP-A-2008-73210.

However, in the technique of JP-A-2008-73210, since a part of the sensors is arranged on the golf club head, swing analysis is impossible in a state where a golf ball is actually hit. Thus, according to JP-A-2008-125722, a three-axis accelerometer is fixed to a shaft part of a golf club via a jig, thus enabling swing analysis when a ball is actually hit.

In the hitting sensation evaluation device for golf club disclosed in JP-A-2008-125722, to a jig that is fixed to a golf club with a fixing measure such as adhesion, a three-axis accelerometer is fixed similarly with a fixing measure such as adhesion, thus installing the three-axis accelerometer on the golf club. However, in this three-axis accelerometer installing method, if there are plural golf clubs to be analyzed, plural jigs and three-axis accelerometers need to be prepared for the individual golf clubs. This requires high cost or a large number of preparation processes.

SUMMARY

An advantage of some aspects of the invention is to provide a motion analysis device which experiences no misalignment or detachment even when the impact of a swing is applied thereto, while enabling easy attachment and removal of electronic component units including a sensor to and from a sporting equipment such as a golf club as an evaluation target.

An aspect of the invention can be implemented as the following forms or application examples.

APPLICATION EXAMPLE 1

This application example is directed to a motion detection device including: a base on which an electronic component is loaded; and a holder installed above a sporting equipment, wherein a fitting portion where the base and the holder can be attached to and removed from each other is provided, the fitting portion is provided with a recessed part provided on one of the base and the holder, and a protruding part provided on the other and fitting with the recessed part.

According to the motion detection device of this application example, the motion detection device can be installed on the sporting equipment more easily. The preparation time for motion analysis can be reduced and analysis work can be executed efficiently. Also, after the end of the motion analysis, the motion detection device can be easily removed from the sporting equipment. Moreover, since a fixing measure is used without depending on the adhering measure or the like disclosed in the related art, there is no stain attachment to the sporting equipment due to the remaining adhesive or the like and therefore motion characteristic analysis can be carried our without decreasing the value of the sporting equipment as an analysis target. Also, according to the motion detection device of this application example, the recessed part is provided in the form of a groove and the protruding part can be slid in a predetermined direction along the groove, or the recessed part and the protruding part can be fitted.

APPLICATION EXAMPLE 2

This application example is directed to the application example described above, wherein the fitting portion includes: a first protruding portion and a second protruding portion provided on the base; groove portions, as the recessed part, provided on the first protruding portion and the second protruding portion and having openings facing each other; and a first flange portion and a second flange portion, as the protruding part, provided on the holder and fitting with the groove portions.

According to this application example, the base and the holder can be easily combined together, for example, by inserting and sliding the flange portions formed on the holder into the groove portions formed on the protrusion of the base. Also, repeated attachment and removal is possible and one motion detection device can be easily combined with plural sporting equipments. Therefore, the cost of motion analysis can be reduced.

APPLICATION EXAMPLE 3

This application example is directed to the application example described above, wherein a sandwiched member held between the sporting equipment and the holder is provided.

According to this application example, since the sandwiched member prevents the holder and the sporting equipment from slipping off each other, occurrence of a relative misalignment with respect to the sporting equipment of the base installed onto the sporting equipment via the holder during the analysis work can be restrained. Also, since the holder does not directly contact the sporting equipment, damage to the sporting equipment by the holder can be prevented and a decrease in the value of the sporting equipment can be prevented. As the sandwiched member, for example, an antislip member wound on the grip of a tennis racket or golf club may be used.

APPLICATION EXAMPLE 4

This application example is directed to the application example described above, wherein the sandwiched member is an elastic member.

According to this application example, the holding force of the motion detection device on the sporting equipment can be exerted stably by the elasticity of the sandwiched member. Therefore, occurrence of a relative misalignment of the motion detection device with respect to the sporting equipment can foe easily restrained and mot ion characteristic analysis of the sporting equipment can be carried out with stable accuracy.

APPLICATION EXAMPLE 5

This application example is directed to the application example described above, wherein the electronic component is an inertial sensor having a detection axis.

According to this application example, with a sporting equipment to swing such as a tennis racket or golf club, the motion characteristic in a swing trajectory can be detected appropriately.

APPLICATION EXAMPLE 6

This application example is directed to the application example described above, wherein a direction indicator indicating a direction of the detection axis of the inertial sensor is provided on the base or the holder.

According to this application example, installation errors of the motion detection device can be prevented. Alternatively, a motion detection device corresponding to a characteristic to be detected can be easily selected simply by confirming the direction indicator.

APPLICATION EXAMPLE 7

This application example is directed to the application example described above, wherein the electronic component is an inertial sensor having a detection axis, and the detection axis of the inertial sensor is set in a direction in which the recessed part or the protruding part extends.

According to this application example, if the direction of the detection axis of the inertial sensor is set, for example, in line with the direction in which the groove portions or the protruding portions extend, the detection axis can be aligned, for example, with the direction of the longitudinal axis of the shaft of a golf club simply by fixing the base and the holder together. Thus, motion detection can be carried out accurately.

APPLICATION EXAMPLE 8

This application example is directed to a motion analysis device including: the motion detection device described above; and a motion analysis unit which analyzes a motion of the sporting equipment, using output data from the inertial sensor.

According to the motion analysis device of this application example, since the motion detection device that can foe easily installed on the sporting equipment is used, the preparation time for motion analysis can be reduced and analysis work can be executed efficiently. Also, after the end of the motion analysis, the motion detection device can be easily removed from the sporting equipment. Moreover, since a fixing measure is used without depending on the adhering measure or the like disclosed in the related art, there is no stain attachment to the sporting equipment due to the remaining adhesive or the like and therefore motion characteristic analysis can foe carried out without lowering the product value of the sporting equipment as an analysis target.

The invention will be described with reference to the accompanying drawings, wherein like numbers reference like elements.

FIGS. 1A to 1C show a motion detection device according to a first embodiment. FIG. 1A is an outer perspective view showing the state where a holder is installed on a golf club as a sporting equipment on which a motion is detected. FIG. 1B is perspective view showing the assembling direction of the motion detection device, along with an enlarged perspective view of the A part shown in FIG. 1A. FIG. 1C is a perspective view of the assembling state.

FIGS. 2A to 2E show a sensor unit provided in the motion detection device according to the first embodiment. FIG. 2A is a face-side plan view. FIG. 2B is a back-side plan view. FIG. 2C is a front view as viewed from the W direction shown in FIG. 2A. FIG. 2D is an enlarged cross-sectional view taken along B-B' shown in FIG. 2A. FIG. 2E is an enlarged cross-sectional view taken along C-C' shown in FIG. 2B and the E-E' shown in FIG. 2C.

FIGS. 3A to 3D show a holder provided in the motion detection device according to the first embodiment. FIG. 3A is an outer plan view. FIG. 3B is a side view as viewed from the G direction shown in FIG. 3A. FIG. 3C is a front view as viewed from the H direction shown in FIG. 3A. FIG. 3D is an outer perspective view as viewed from the J direction shown in FIG. 3B.

FIGS. 4A to 4C show the assembling state of the motion detection device according to the first embodiment. FIG. 4A is a cross-sectional view showing the installation state of the holder. FIG. 4B is a cross-sectional view showing the installation state of the detection device. FIG. 4C is a partial enlarged view of the J part shown in FIG. 4B.

FIGS. 5A to 5C show the assembling state of the motion detection device according to the first embodiment. FIG. 3A is a schematic cross-sectional view taken along L-L' shown in FIG. 4C. FIG. 5B is a schematic enlarged cross-sectional view taken along M-M' shown FIG. 5A. FIG. 5C is a schematic enlarged cross-sectional view showing the pressing protruding operation state.

FIGS. 6A to 6D show a direction indicator in the motion detection device according to the first embodiment. FIGS. 6A and 6B show display examples to the sensor unit. FIGS. 6C and 6D show the appearances representing display examples to the holder.

DESCRIPTION OF EXEMPLARY EMBODIMENTS

Hereinafter, embodiments of the invention will be described with reference to the drawings.

First Embodiment

Figures 1A, 1B, 1C:
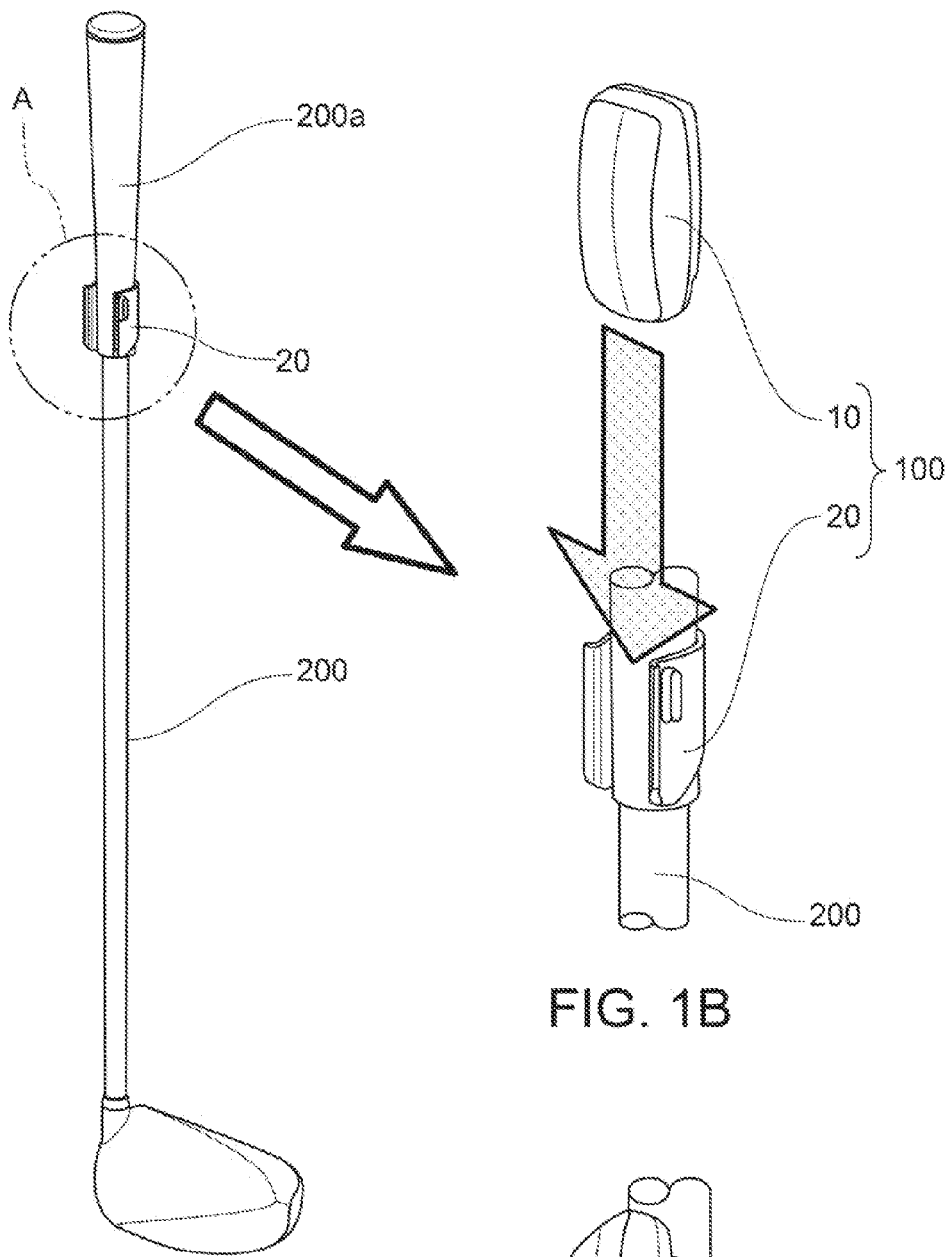

FIGS. 1A to 1C show a motion detection device according to a first embodiment. FIG. 1A is an outer perspective view showing the state where a holder is installed on a golf club as a sporting equipment on which a motion is detected. FIG. 1B is a perspective view showing the assembling direction of the motion detection device, along with an enlarged perspective view of the A part shown in FIG. 1A. FIG. 1C is a perspective view of the assembled state. As shown in FIG. 1C, in a motion detection device 100 according to this embodiment (hereinafter referred to as detection device 100), a sensor unit 10 having inside an electronic component such as an inertial sensor, not shown, is installed via a fitting portion, described later, in the direction of the arrow shown in FIG. 1B onto a holder 20 that can be installed, for example, on a grip portion 200a of a golf club 200 as shown in FIG. 1A, as a sporting equipment swung by a player. The motion detection device 100 is thus installed on the golf club 200, as shown in FIG. 1C.

FIGS. 2A to 2E show the sensor unit 10. FIG. 2A is a face-side plan view of the sensor unit 10. FIG. 2B is a back-side plan view. FIG. 2C is a front view as viewed from the F direction shown in FIG. 2A. FIG. 2D is an enlarged cross-sectional view taken along B-B' shown in FIG. 2A. FIG. 2E is an enlarged cross-sectional view taken along C-C' shown in FIG. 2B and E-E' shown in FIG. 2C.

As shown in FIGS. 2D and 2E, the sensor unit 10 includes a casing in which an internal space 10a is formed by a cover 12 fixed to a bass 11 with a screw 14. On a surface 11a of the base 11 on the side of the internal space 10a, an electronic component 13 as a detection unit of the sensor unit 10 is formed by an electronic device 13b and a circuit board 13a on which the electronic device 13b is mounted, and the circuit board 13a is fixed to the surface 11a of the base 11 by a measure such as adhesion. At least one of the electronic devices 13b may be preferably an inertial sensor. Also, the measure to fix the cover 12 to the bass 11 is not limited to the screw 14 and may be, for example, adhesion. If the base 11 and the cover 12 are made of plastics, the cover 12 may be welded and thus fixed to the base 11.

In the base 11, a first protrusion 11b and a second protrusion 11c are provided extending parallel to each other along the Y direction in the illustration, as shown in FIGS. 2B and 2D. On the first protrusion 11b, a first groove 11d as a recessed part is formed along the Y direction. On the second, protrusion 11c, a second groove 11e as a recessed part is similarly formed along the Y direction. The openings of the first groove 11d and the second groove 11e in the X direction are formed so as to face each other. The Y(-) direction of the first groove 11d and the second groove 11e, that is, the side in the assembling direction of the sensor unit 10 shown in FIG. 1B, is opened, and a groove wall 11f is formed the opposite direction. Also, as an engaging portion to engage with a detachment prevention protrusion of the holder 20, described later, a cut-out portion 11g is formed on the first protrusion 11b and a cut-out portion 11h is formed on the second protrusion 11c.

FIGS. 3A to 3D show the holder 20. FIG. 3A is an outer plan view. FIG. 3B is a side view as viewed from the G direction shown in FIG. 3A. FIG. 3C is a front view as viewed from the H direction shown in FIG. 3A. FIG. 3D is an outer perspective view as viewed from the J direction shown in FIG. 3B.

As shown in FIG. 3C, the holder 20 includes an installation portion 20a installed in the way to be wound on the golf club 200 as a sporting equipment, a first flange portion 20b as a protruding part that is inserted in the first groove 11d of the sensor unit 10 shown in FIGS. 2A to 2E and that protrudes in the X(-) direction and extends in the Y direction, and a second flange portion 20c as a protruding part that is inserted in the second groove 11e and that protrudes in the X(+) direction and extends in the Y direction.

As shown in FIG. 3B, one end 20d of the holder 20 is formed along the X-Z plane, whereas the other end 20e is formed, in this example, in a shape along a large round columnar surface intersecting with the X-Z plane. As a result, the other end 20e has a recessed planar shape, as shown in FIG. 3A. As the other end 20e is formed in this manner, a clear difference in shape from the one end 20d can be realized. Therefore, as will be described in detail later, in the case where the function to designate an assembling direction of the sensor unit 10 fitted with the holder 20 is provided, the holder 20 may be installed on the golf club 200 after the other end 20e with a different shape is aligned as an indicator of the assembling direction. Thus, an error in the assembling direction of she sensor unit 10 can be prevented. The configuration to differentiate the shape of the other end 20e from the one end 20d in this embodiment is not limiting, and a simple marking may be given instead.

The holder 20 may include detachment prevention protrusions 20f, 20g for the sensor unit 10. The detachment prevention protrusions 20f, 20g engage with engaging portions of the sensor unit 10, not shown, at the time of assembling the sensor unit 10, as described later, and thus prevent the sensor unit 10 from detaching from, the holder 20. As the detachment prevention protrusions 20f, 20g are provided, pressing protrusions 20h, 20j to disengage the detachment prevention protrusions 20f, 20g from the engaging portions of the sensor unit 10 when removing the sensor unit 10 from the holder 20 may be provided. When removing the sensor unit 10 from the holder 20, the pressing protrusions 20h, 20j can be pressed, in the directions of the arrows with fingers 300, as shown in FIG. 3C, reducing the distance between the detachment prevention protrusions 20f, 20g and thereby disengaging the detachment prevention protrusions 20f, 20g from the engaging portions of the sensor unit 10. Thus, the sensor unit 10 can be removed from the holder 20.

Next, the assembling state of the sensor unit 10 into the holder 20 will be described. FIG. 4A is a cross-sectional view illustrating the installation state of the holder 20 onto the golf club 200. As shown in FIG. 4A, the holder 20 is installed on the grip portion 200a of the golf club 200. The grip portion 200a is configured in such a way that an antislip grip rubber 200c is applied or wound on a shaft portion 200b. The grip rubber 200c is made of an elastic member, for example, rubber, urethane elastomer or the like. A repulsive force generated by the compression of the grip rubber 200c between the installation portion 20a of the holder 20 and the shaft portion increases a fractional force between the holder 20 and the grip rubber 200c. Thus, a misalignment of the holder 20 from the golf club 200 can be prevented.

In this embodiment, an example is which the detection device 100 is installed on the golf club 200 is given. However, if there is no antislip measure provided on the grip portion, for example, as on a baseball bat, an elastic member like the grip rubber 200c in FIG. 4A may be inserted between the baseball bat and the installation portion 20a of the holder 20, that is, an antislip member as a so-called sandwiched member may be arranged, thus preventing a misalignment of the holder 20. As the sandwiched member, an elastic resin such as rubber or urethane elastomer or a soft metal or the like is preferable.

FIG. 4B is a cross-sectional view showing the assembling state at a position equivalent to B-B' shown in FIG. 1A, where the holder 20 and the sensor unit 10 are assembled together. To assemble the detection device 100, the sensor unit 10 is moved in the direction, of the arrow onto the holder 20 installed on the golf club 200, as shown in FIG. 1B, and the first flange portion 20b and the second flange portion 20c provided on the holder 20 are inserted into, that is, so-called slid into the first groove 11d and the second, groove 11e formed on the sensor unit 10, as shown in FIG. 4B. Thus, the sensor unit 10 is installed on the holder 20 installed on the golf club 200 and thus assembled into the detection device 100.

As the holder 20 is installed on the grip portion 200a of the golf club 200, shown in FIG. 4A, the grip rubber 200c of the grip portion 200a is sandwiched between the installation portion 20a of the holder 20 and the shaft portion 200b. In this state, an installation opening 20k opposite the installation portion 20a is displaced to a greater width by the elasticity of the grip rubber 200c, and the first flange portion 20b and the second flange portion 20c are moved outward to become a first flange portion 20b' and a second flange portion 20c'.

Then, as the flange portions in the form of the first flange portion 20b' and the second flange portion 20c' are inserted into the first groove 11d and the second groove 11e, as shown in FIG. 4B, these flange portions are aligned in the direction of the arrow K in FIG. 4C by a first groove wall surface 11*j* of the first groove 11*d* and a second groove wall surface 11*k* of the second groove 11*e*, as shown in FIG. 4C. That is, in the state where the detection device 100 shown in FIG. 4B is achieved, the holder 20 is aligned in the direction of compressing the grip rubber 200*c* and therefore the holding force of the holder 20 onto the grip portion 200*a* can be increased. Thus, the detection device 100 can be aligned with the golf club 200 more securely and accurate swing data of the golf club 200 can be acquired without causing any misalignment of the detection device 100 due to an inertial force or impact applied to the detection device 100 by a swing of the golf club 200.

Figure 5A:
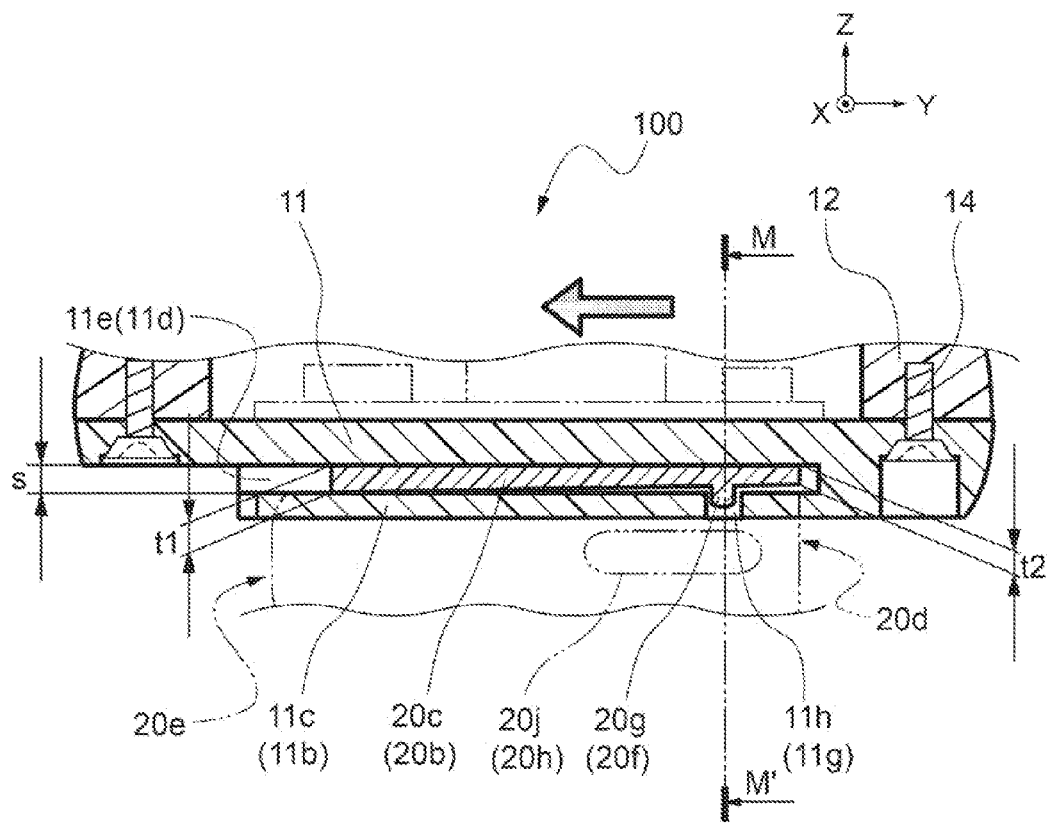

FIG. 5A is a schematic cross-sectional view taken along L-L' shown in FIG. 4C. As shown in FIG. 5A, the sensor unit 10 is moved in the direction of the arrow in FIG. 5A relative to the holder 20. The second flange portion 20*c* of the holder 20 is relatively inserted into the second groove 11*e*, and similarly the first flange portion 20*b* of the holder 20 is relatively inserted into the first groove 11*d*. The detection device 100 is thus assembled. Since the L-L' part shown in FIG. 4C corresponds to the second groove 11*e* and the second flange portion 20*c*, an example using the second groove 11*e* and the second flange portion 20*c* will be described hereinafter. However, the same description applies to the first groove 11*d* and the first flange portion 20*b* as well.

When the sensor unit 10 is inserted in the direction of the arrow into the holder 20, first, the end of the second flange portion 20*c* on the side of the one end 20*d* of the holder 20 starts to be inserted into the second groove 11*e*. The second flange portion 20*c* is formed in such a way that the thickness (Z direction) t2 on the side of the one end 20*d* and the height *a* in the Z direction of the second groove 11*e* hold the relation of t2<s. That is, by causing the second flange portion 20*c* on the side of the one end 20*d* of the holder 20 to have a smaller thickness than the groove height of the second groove 11*e*, assembling at she start of insertion can be made easier.

Moreover, the second flange portion 20*c* is relatively inserted into the second groove 11*e*, and the detachment prevention protrusion 20*g* of the holder 20 fits with the cut-out portion 11*h* formed on the second protrusion 11*c*, as shown in FIG. 5A. This completes the insertion. In this state, if the thickness t1 of the second flange portion 20*c* on the side of the other end 20*e* of the holder 20 is formed with the relation of t1>t2, the space between the second groove 11*e* and the second flange portion 20*c* in the Z direction is narrower on the side of the other end 20*e* than on the side of the one end 20*d* of the holder 20. Therefore, for example, by setting the condition of t1≈s or t1>s, the second flange portion 20*c* is sandwiched by the surfaces in the Z direction of the second groove 11*e*, and detachment of the sensor unit 10 from the holder 20 can be restrained. Also, wobbling of the sensor unit 10 in the Z direction relative to the holder 20 can be restrained and accurate swing data of the golf club 200 can be acquired.

Figures 5B, 5C:
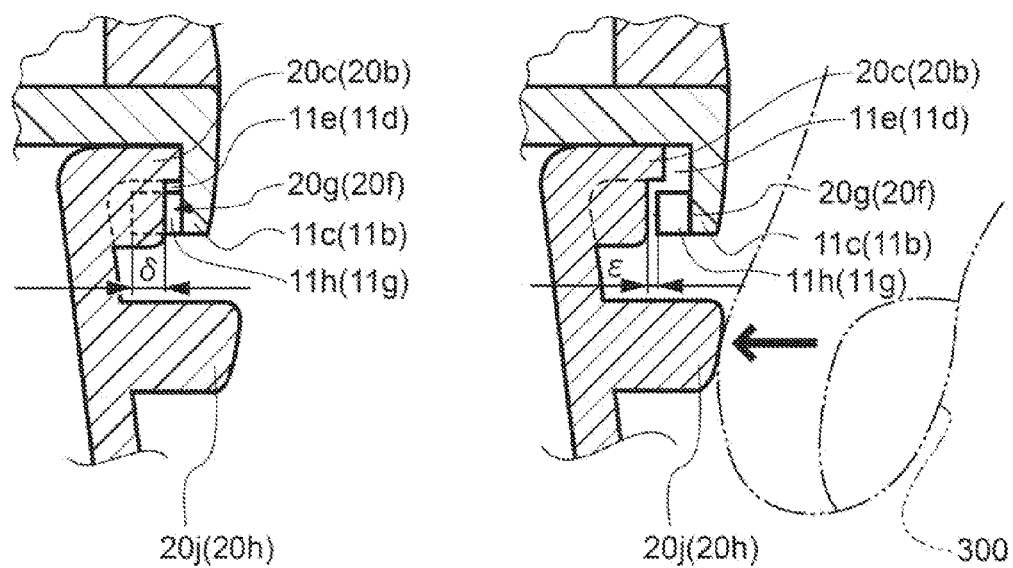

FIG. 5B is a schematic enlarged cross-sectional view taken along M-M' shown in FIG. 5A. In the state where the second flange portion 20*c* is inserted in the second groove 11*e*, as shown in FIG. 5B, the detachment prevention protrusion 20*g* fits with the cut-out portion 11*h* of the second protrusion 11*c* with a fitting amount δ. The installation state between the sensor unit 10 and the holder 20 shown in FIG. 5A is thus maintained.

If the sensor unit 10 is to be detached from the holder 20 in this state, the pressing protrusion 20*j* is pressed in the direction of the arrow shown in FIG. 5C, for example, with the finger 300, as shown in FIG. 5C. Thus, the detachment prevention protrusion 20*g* detaches from the cut-out portion 11*h*. As the sensor unit 10 is slid in the direction opposite to the arrow shown in FIG. 5A. in the state where a space ε (ε>0) is generated, the sensor unit 10 can be removed from the holder 20. By thus providing the detachment prevention protrusions 20*g*, 20*f* and the cut-out portions 11*h*, 11*g* which the detachment prevention protrusions 20*g*, 20*f* can fit with, the sensor unit 10 can be easily removed from the holder 20 when necessary, while installability of the sensor unit 10 onto the holder 20 is secured.

If the electronic devices 13*b* provided in the detection device 100 include an inertial sensor having a detection axis, the detection axis of the inertial sensor needs to be aligned relatively to the golf club 200 when installing the detection device 100 on the golf club 200. In this case, it is preferable to provide a direction indicator for the detection axis as shown in FIGS. 6A to 6D, as a measure to indicate the direction of the detection axis clearly.

FIGS. 6A and 6B are outer perspective views showing direction indicators 12*a*, 12*b* formed as an example on an outer surface of the cover 12 of the sensor unit 10. FIGS. 6C and 6D are outer perspective views showing direction indicators 20*m*, 20*n* formed as an example on an outer surface of the holder 20.

As shown in FIG. 6A, the direction indicator 12*a* as an example is embossed in the shape of an arrow on the outer surface of the cover 12. As shown in FIG. 6B, the direction indicator 12*b* as an example is formed in the shape of a linear protrusion on the outer surface of the cover 12.

As shown in FIG. 6C, the direction indicator 20*m* as an example is embossed in the shape of an arrow on the outer surface of the holder 20. As shown in FIG. 6D, the direction indicator 20*n* as an example is formed in the shape of a linear protrusion on the outer surface of the holder 20. Even in the case where the direction indicators 20*m*, 20*n* are formed on the holder 20, the assembling of the sensor unit 10 into the holder 20 has predetermined directionality as shown in FIG. 1B. Therefore, the sensor unit 10 can be installed in line with the direction of the inertial sensor having the detection axis included in the electronic devices 13*b*, by aligning the assembling direction of the holder 20 with the direction indicators 20*m*, 20*n* and thus installing the holder 20 correctly.

All of the above direction indicators 12*a*, 12*b*, 20*m*, 20*n* are examples that are integrally formed in a protruding shape. However, these examples are not limiting. For example, a direction indicator is formed in a recessed shape by molding or engraving, or a printed mark may be used. Also, the arrow shape and the linear shape are not limiting and a mark with any shape that enables identification of directionality may be used.

As another modification example, if the detection axis of the inertial sensor is set, for example, in the direction in which the groove portions, the first flange portion and the second flange portion extend, instead of providing a direction indicator, the detection axis can be aligned with a predetermined direction simply by fitting the base and the holder together, and therefore motion detection can be carried out accurately. For example, if an angular velocity sensor is used as the inertial sensor, and the direction in which the groove portions, the first flange portion and the second flange portion extend is taken as the axial direction, angular velocity about the shaft axis can be detected accurately and a change or the like in the face angle of the golf club head can be traced accurately.

In the above detection device 100, the sensor unit 10 can be easily installed on the holder 20 installed on the golf club 200 simply by sliding and fitting the sensor unit 10 in such a way that the flange portions 20*b*, 20*c* provided on the holder 20 are inserted into the grooves 11*d*, 11*e* provided on the sensor unit 10. Moreover, as the sensor unit 10 is installed on the holder 20, the grip rubber 200*c* provided on the grip portion 200*a* is compressed and sandwiched between the installation portion 20*a* of the holder 20 and the shaft portion 200*b*, thus increasing the holding force of the detection device 100 on the golf club 200 and restraining a misalignment of the installation position due to an inertial force or impact applied, to the detection device 100 by a swing of the golf club 200. Therefore, accurate swing data of the golf club 200 can be acquired. Order than the sliding-fitting structure, a recessed part such as a groove portion or hole portion may be provided on one of the base and the holder, whereas a protruding part such as a protrusion may be provided on the other of the base and the holder, thus allowing the base and the holder to press and fit with each other.

Second Embodiment

Figure 7:
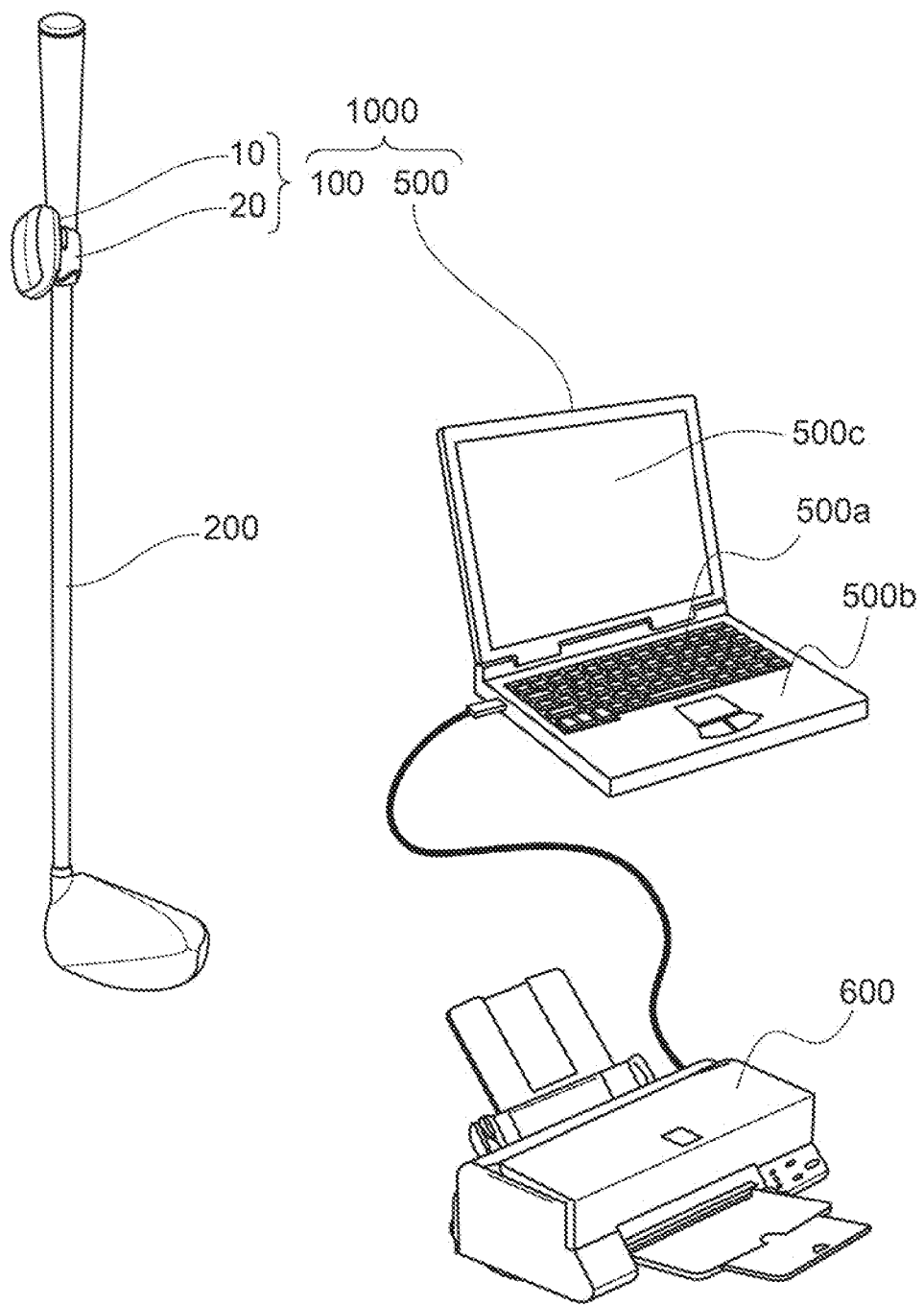
FIG. 7 shows the appearance of a motion analysis device according to a second embodiment.

FIG. 7 shows the appearance of a motion analysis device according to a second embodiment. As shown in FIG. 7, a motion analysis device 1000 (hereinafter referred to as analysis device 1000) according to this embodiment includes the detection device 100 according to the first embodiment, and a computer 500 which acquires motion data of the golf club 200 as a sporting equipment obtained by the detection device 100 and analyses the motion data. The computer 500 may be preferably a personal computer 500 (hereinafter referred to as PC 500) including a processing unit 500*b* which has an input unit 500*a*, and a display unit 500*c* which displays the result of processing. A printer 600 as an external output unit to record the result of analysis by the PC 500 may also be provided. In this embodiment, the detection device 100 and the PC 500 are configured to transmit and receive data to and from each other via wireless communication, as described later. However, this configuration is not limiting. For example, a removable recording medium such as SD card or USB memory may be installed in the detection device and transmission and reception of data may be carried out via the recording medium.

Figure 8:
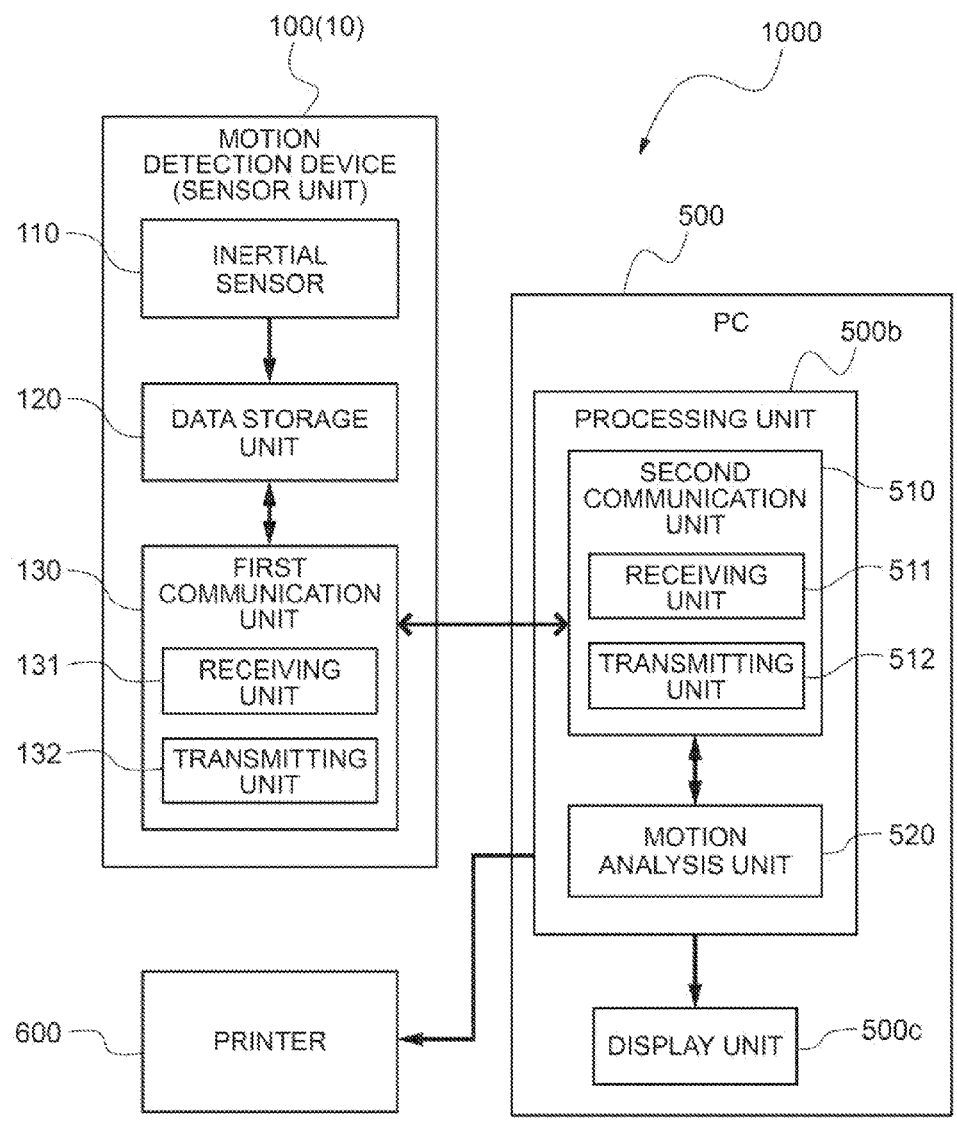
FIG. 8 is a block diagram showing the motion analysis device according to the second embodiment.

FIG. 8 is a block diagram of the analysis device 1000 shown in FIG. 7. As shown in FIG. 3, the sensor unit 10 provided in the detection device 100 has at least an inertial sensor 110; a data storage unit 120 in which data is stored while data processing is carried out; and a first communication unit 130 including a transmitting unit 132 which transmits data to the PC 500 and a receiving unit 131 which receives transmission from the PC 500. The PC 500 as an analysis device includes: a processing unit 500*b* that includes a second communication unit 510 including a receiving unit 511 which receives data transmitted from the first communication unit 130 of the detection device 100 and a transmitting unit 512 which transmits data to the first communication unit 130, and a motion analysis unit 520 which carries out data processing of detection data that is acquired and analyses the data; and a display unit 500*c* which displays the result of the analysis by the motion analysis unit 520. Also, the printer 600 is provided as an external output unit of the result of the analysis.

When the golf club 200 with the detection device 100 installed thereon is swung, the inertial sensor 110 detects an inertial force and the detected data is sent to the data storage unit 120. The data storage unit 120 processes the data into a data format that can be transmitted to the PC 500 and then accumulates (stores) the data until receiving a transmission instruction from the PC 500. When a predetermined swing for motion analysis is finished, motion analysis work is started. As a command to start analysis is given to the processing unit 500*b* from the input unit 500*a*, not shown, an instruction to transmit detected data is transmitted wirelessly to the first communication unit 130 from the transmitting unit 512 of the second communication unit 510. Based on the command received by the receiving unit 131 of the first communication unit 130, the detected data stored in the data storage unit 120 is transmitted to the processing unit 500*b* from the transmitting unit 132. In this embodiment, the first communication unit 130 and the second communication unit 510 are connected wirelessly. However, these units may also be wired together. As described above, a removable storage medium may be installed in the detection device 100 and data may be transmitted and received via the storage medium.

The detected data received by the receiving unit 511 of the second communication unit 510 is sent to the motion analysis unit 520, and motion analysis of the golf club 200 is executed based on a predetermined analysis program. The result of the analysis is displayed as an image on the display unit 500*c* provided on the PC 500 or recorded and outputted on a recording medium by the printer 600 as an external output unit.

In the motion analysis device 1000 according to this embodiment, the detection device 100 can be easily attached to and removed from the illustrated sporting equipment (in this embodiment, the golf club 200). Therefore, for example, in the case of analyzing characteristics of plural sporting equipments, it suffices to prepare at least one set of detection device 100. This enables reduction in the cost for analysis. Also, since this technique is different from the installation of the sensor on the sporting equipment via an adhering measure disclosed in the related art, a reduction in the analysis preparation time and removal of the sensor from the sporting equipment after analysis can be easily realized, leading to a reduction in analysis time and prevention of stain attachment of an adhesive or the like to the sporting equipment. Thus, analysis of motion characteristics of the sporting equipment can be carried out without lowering the product value of the sporting equipment.

The motion analysis device 1000 according to this embodiment can not only be applied to sporting gears such as a golf club but also can be used for various other applications. For example, the motion detection device may be installed on a movable portion of a robot device or the like, so as to monitor the operating status of the robot device. Also, motion analysis data obtained by the motion analysis device 1000 can not only be displayed simply as motion data, but also can be applied to a measure for adding the motion analysis data to processing data in the case of modifying and processing a sporting equipment as an analysis target to have a proper capability, and thus processing the sporting equipment into a sporting equipment with optimum mobility.

The entire disclosure of Japanese Patent Application No. 2013-130319, filed Jun. 21, 2013 is expressly incorporated by reference herein.

What is claimed is:

1. A motion detection device comprising:
    a base on which an electronic component is loaded; and
    a holder installed above a sporting equipment;
    wherein a fitting portion where the base and the holder can be attached to and removed from each other is provided, the fitting portion is provided with a recessed part provided on the base or the holder, and a protruding part provided on the other and fitting with the recessed part, and the holder comprises a portion that engages around the sporting equipment and an installation opening opposite an installation portion that is configured to be displaced to a greater width when installed above the sporting equipment with the base configured to attach to a side of the holder having the installation opening, the holder thereby aligned in a direction to compress a portion of the sporting equipment to increase a holding force of the electronic component to the sporting equipment.

2. The motion detection device according to claim 1, wherein the fitting portion includes:
    a first protruding portion and a second protruding portion provided on the base;
    groove portions, as the recessed part, provided on the first protruding portion and the second protruding portion and having openings facing each other; and
    a first flange portion and a second flange portion, as the protruding part, provided on the holder and fitting with the groove portions.

3. The motion detection device according to claim 1, further comprising a sandwiched member held between the sporting equipment and the holder.

4. The motion detection device according to claim 3, wherein the sandwiched member is an elastic member.

5. The motion detection device according to claim 1, wherein the electronic component is an inertial sensor having a detection axis.

6. The motion detection device according to claim 5, wherein a direction indicator indicating a direction of the detection axis of the inertial sensor is provided on one of the base or the holder.

7. A motion analysis device comprising:
    the motion detection device according to claim 5; and
    a motion analysis unit which analyzes a motion of the sporting equipment, using output data from the inertial sensor.

8. The motion detection device according to claim 1, wherein the electronic component is an inertial sensor having a detection axis, and
    the detection axis of the inertial sensor is set in a direction in which the recessed part or the protruding part extends.

9. The motion detection device according to claim 1, wherein the fitting portion is configured to allow the base to be received by the holder in only one predetermined direction of sliding of the protruding part along the recessed part.

10. The motion detection device according to claim 1, wherein one end of the holder has a first shape and a second opposite end of the holder has a second shape, the first and second shapes being different to allow the holder to be installed in the direction to compress a portion of the sporting equipment.

11. The motion detection device according to claim 1, wherein one end of the holder is formed along an X-Z plane, and the other end of the holder is formed in a shape along a large round columnar surface intersecting with the X-Z plane with the other end having a recessed planar shape.

12. The motion detection device according to claim 1, wherein the holder includes a detachment prevention protrusion and the base includes an engaging portion, the detachment prevention protrusion is configured to engage the engaging portion to prevent the base from detaching from the holder, and further including a pressing protrusion configured to disengage the detachment prevention protrusion from the engaging portion.

* * * * *